Figure 1:
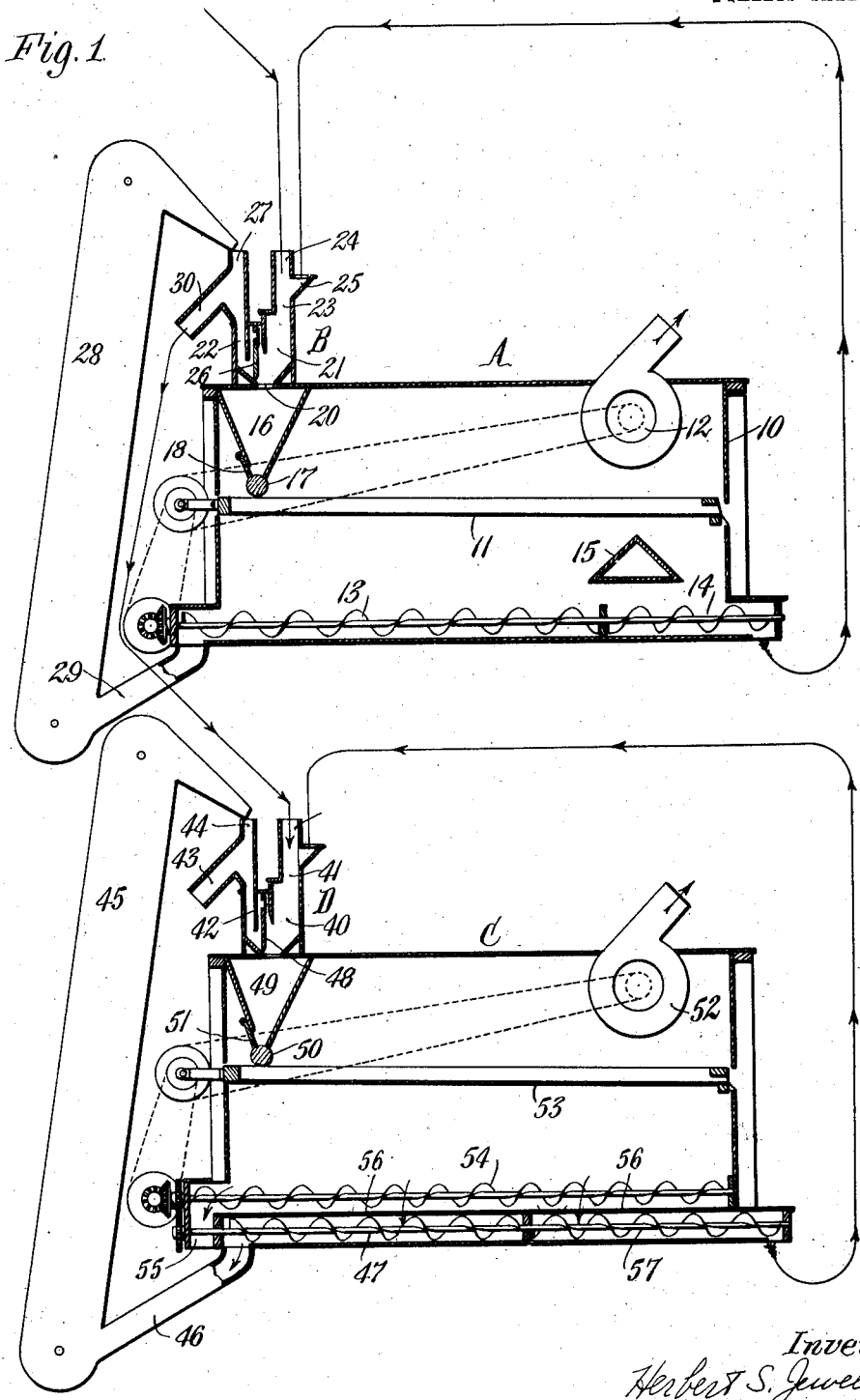

No. 894,009. PATENTED JULY 21, 1908.
H. S. JEWELL.
METHOD OF AND APPARATUS FOR PURIFYING MIDDLINGS AND OTHER MATERIALS.
APPLICATION FILED JULY 12, 1907.

2 SHEETS—SHEET 1.

Witnesses:
E. A. Volk.
A. G. Dimond.

Inventor.
Herbert S. Jewell,
By Wilhelm, Parker & Hard,
Attorneys.

UNITED STATES PATENT OFFICE.

HERBERT S. JEWELL, OF BUFFALO, NEW YORK.

METHOD OF AND APPARATUS FOR PURIFYING MIDDLINGS AND OTHER MATERIALS.

No. 894,009.

Specification of Letters Patent.

Patented July 21, 1908.

Application filed July 12, 1907. Serial No. 383,389.

*To all whom it may concern:*

Be it known that I, HERBERT S. JEWELL, a citizen of the United States, residing at Buffalo, in the county of Erie and State of New York, have invented a new and useful Improvement in Methods of and Apparatus for Purifying Middlings and other Materials, of which the following is a specification.

This invention relates to that class of purifying operations and apparatus in which the material is acted upon by an air current which carries off the light impure particles, while the heavy purified particles escape downwardly.
In purifying middlings and other grain products it is essential to the production of uniform results that the layer of material on the sieve should be as uniform in thickness as possible, not only crosswise of the sieve but also lengthwise thereof, because when the layer is uneven in thickness and the sieve is almost bare in places, as often is the case, the air current passes mainly through the parts of the sieve which are thinly covered with material and acts but little upon the thicker portions of the layer of material, where the full separating action of the air current is required, and the purification or separation is in such cases greatly impaired and very uneven.

Middlings purifiers and similar machines are often provided with feed gates or valves which adjust themselves automatically in accordance with the rate at which material is supplied to the feed hopper, the gate or valve opening a wider feed passage as the feed increases and contracting the feed passage as the feed decreases. Automatic feed gates or valves of this kind distribute the material across the sieve but cannot maintain a layer of uniform thickness in the longitudinal direction of the sieve because when the feed is heavy they deliver a thick layer and when the feed is light they deliver a thin layer to the sieve.

The object of this invention is to feed to the purifier a layer of a predetermined thickness under all conditions of feed, whether light or heavy, and to maintain thereby a layer of practically uniform thickness or a uniform load, except in so far as the layer or load becomes thinner by the removal of light material by the air current and the escape of purified material downwardly as the separation progresses, the uniformity of thickness of the layer of material under treatment insuring a uniform action of the air current and also a uniform sifting action and consequently a uniform separation or purification of the material. This object is accomplished, briefly stated, by returning to the feed hopper of the purifier enough of the purified middlings or other material which has been treated to supply the feed hopper, in addition to the new or original material which it receives for purification or treatment, with a quantity of purified material more than sufficient to maintain a layer of uniform thickness or a uniform load in the purifier, and to discharge automatically the excess of returned purified material, which is not required for maintaining a uniform feed or load.

Figure 2:
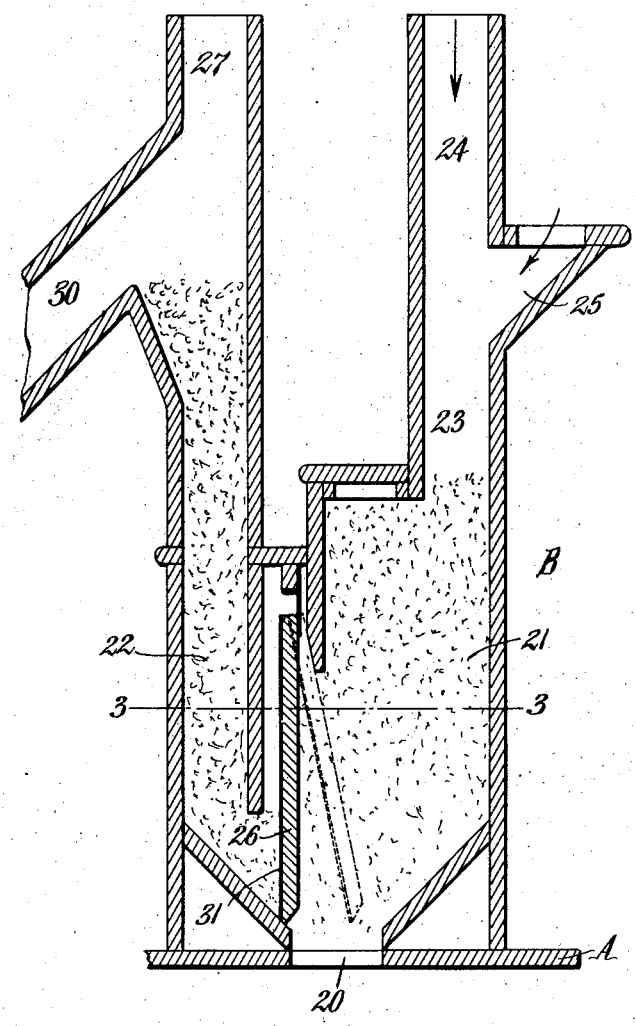
Figure 3:
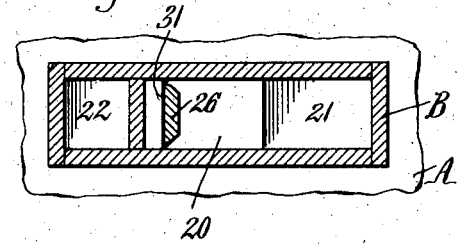

In the accompanying drawings, consisting of two sheets: Figure 1 is a sectional elevation of an apparatus by which this invention can be practiced. Fig. 2 is a sectional elevation, on an enlarged scale, of an automatic feed regulator which forms part of this apparatus. Fig. 3 is a horizontal section in line 3—3, Fig. 2.

Like reference characters refer to like parts in the several figures.

A represents a middlings purifier of well known construction, comprising a casing 10, a shaking sieve 11, a fan 12 for drawing an air current upwardly through the sieve, a front conveyer 13 for the purified middlings, a rear conveyer 14 for the imperfectly purified middlings, a cut-off 15 above the conveyers, and a feed hopper 16 provided with a feed roll 17 and an adjustable feed gate 18. All of these parts may be of any well known or suitable construction and arrangement.

The feed hopper receives the material from a feed regulator B through a passage 20 in the bottom of the regulator. The latter comprises a feed compartment or chamber 21 which is arranged over the feed passage 20 and a return compartment or chamber 22 which is arranged adjacent to the feed compartment and communicates with the same above the feed passage. The feed compartment receives the material to be purified or treated through a feed spout 23 and this spout receives through a spout 24 the new or original material to be purified or treated, and through a spout 25 any imperfectly purified middlings which have passed through the tail portion of the sieve to the rear conveyer 14 and which must be again purified.

The return chamber 22 is separated from the feed chamber 21 by a pendent valve or gate 26 which is so constructed and arranged that it is acted upon in opposite directions by the weight of the material in these chambers and closes the communication between the same when the pressure of the material in the feed chamber preponderates, as represented in full lines in Fig. 2, and opens this communication, as represented in dotted lines, when the pressure of the material in the return chamber preponderates. The return chamber 22 receives the returned purified middlings through a spout 27 which receives the same from an elevator 28 to which the purified middlings are delivered by the front conveyer 13 and a spout 29. The return chamber is provided with an overflow or bypass 30 through which the excess of returned purified middlings is discharged which is not required for maintaining a uniform feed or load. The pendent gate or valve 26 is preferably constructed with thin edge portions formed by a plate 31, Fig. 3, in order to render the movements of the gate easy.

The purified middlings are returned to the regulator and accumulate in the return chamber 22 thereof. So long as enough material is supplied to the feed chamber 21 by the spout 23 to maintain a uniform feed, the material contained in the feed chamber holds the gate 26 closed and the latter prevents the returned middlings in the return chamber 22 from entering the feed chamber. The returned purified middlings accumulate in the return chamber until they reach the overflow or bypass 30 and thereafter are discharged through the same. Whenever the supply of material to the feed chamber 21 through the feed spout 23 becomes insufficient to maintain a proper load on the sieve, the pressure of the material in the return chamber preponderates and opens the regulator gate and material flows from the return chamber into the feed chamber and augments the volume of material therein so long as the deficiency in the feed continues. When the feed again becomes normal or greater than normal the regulator gate is again closed by the material in the feed chamber and the returned material again accumulates in the return chamber until it reaches the overflow. The discharge of returned purified material is then resumed through the overflow passage.

When the feed to a middlings purifier is light, which is usually the case upon starting the mill, the purified middlings are returned to the regulator and no purified middlings are discharged until the feed has increased to such an extent that the returned purified middlings are in excess of the requirements for a uniform feed. The discharge of purified middlings then begins and continues so long as the purified middlings returned to the regulator exceed the quantity required for maintaining a uniform feed.

By maintaining on the sieve a layer of material of uniform thickness, or a uniform load, the sifting action as well as the air action are kept uniform and the separating or purifying operation is carried on uniformly, thereby producing uniform results, both as to the extent and character of the purification or separation and as to the character and quantity of the light material which is removed by the air current.

In purifying middlings by this method the miller is not required to watch and regulate the purifiers, even in starting up the mill, which is done weekly and sometimes daily, but the purification will be conducted properly by each purifier when its full load has been secured and no purified middlings will be discharged from a purifier until a full load has been secured. This keeps the product up to the desired grade and produces a larger quantity of highly purified middlings and a larger percentage of high grade flour.

While this described method of treatment is particularly desirable for purifying middlings, corn meal, oat meal and other grain products, it is applicable also to other separating or purifying operations in which the material is subjected to an air separation and in which it is important to maintain a uniform feed or load for the separating mechanism.

The purified material which is delivered by the overflow of the purifier may be stored or further treated in any manner which the character of the material may render desirable. In the apparatus shown in Fig. 1, the purified material so delivered by the purifier passes to a second purifier C of any suitable construction in which the material is subjected to a second purifying or separating operation. D represents the automatic feed regulator of this purifier which is similar in construction to the regulator B of the purifier A and comprises a feed chamber 40, which receives the material through a spout 41, a return chamber 42 provided with an overflow 43 and with a spout 44 which receives the returned purified material from an elevator 45, spout 46 and conveyer 47, and a pendent regulator gate or valve 48. 49 represents the feed hopper of this purifier, 50 the feed roll, 51 the feed gate, 52 the fan and 53 the sieve.

54 represents a conveyer by which a portion of the purified middlings may be discharged through a spout 55, while another portion of the purified middlings is sent down to the conveyer 47, this operation being controlled in a well known way by slides in a bottom 56.

57 represents a conveyer which removes the imperfectly purified middlings which pass through the rear portion of the sieve and are returned to the feed chamber of the regulator for further purification.

I claim as my invention:

1. The herein described method of subjecting material to an air separation in a layer or load of uniform thickness which consists in returning material which has been subjected to the separation and adding such returned material automatically to the feed in such quantity as to maintain a uniform load or feed for the separating mechanism, and discharging the excess of returned material which is not required for maintaining such uniform load or feed.

2. The herein described method of subjecting material to a combined sifting and air separation in a layer or load of uniform thickness which consists in returning material which has been subjected to the separation and adding such returned material to the feed automatically in such quantity as to maintain a uniform load or feed for the sieve, and discharging the excess of returned material which is not required for maintaining such uniform load or feed.

3. The herein described method of purifying middlings and similar grain products by a combined sifting and air separation in a layer or load of uniform thickness which consists in returning to the feed the separated imperfectly purified middlings which are required to be further purified, and also returning purified middlings and adding such returned purified middlings to the feed automatically in such quantity as to maintain a uniform load or feed for the sieve, and discharging the excess of returned purified middlings which is not required for maintaining such uniform load or feed.

4. The combination of a purifying mechanism and an automatic feed regulator provided with means for automatically adding returned purified material to the feed, means for returning purified material to said regulator, and means for discharging the excess of such returned material which is not required for maintaining a uniform load or feed, substantially as set forth.

5. The combination of a purifying mechanism and an automatic feed regulator comprising a feed chamber and a return chamber, means for automatically controlling the communication between said chambers, means for returning purified material to said return chamber, and an overflow in the return chamber for discharging the excess of returned purified material, substantially as set forth.

6. The combination of a purifying mechanism and an automatic feed regulator comprising a feed chamber and a return chamber, a pendent movable gate for automatically controlling the communication between said chambers, means for returning purified material to said return chamber, and an overflow in the return chamber for discharging the excess of returned purified material, substantially as set forth.

Witness my hand in the presence of two subscribing witnesses.

HERBERT S. JEWELL.

Witnesses:
EDWARD WILHELM,
C. B. HORNBECK.